United States Patent [19]

Nayar

[11] 3,860,420

[45] Jan. 14, 1975

[54] METHOD OF MAKING WELDING RODS BY SINTERING IN THE PRESENCE OF A LIQUID PHASE

[75] Inventor: Harbhajan S. Nayar, Plainfield, N.J.

[73] Assignee: Air Reduction Company Incorporated, New York, N.Y.

[22] Filed: June 18, 1973

[21] Appl. No.: 371,088

Related U.S. Application Data

[63] Continuation of Ser. No. 99,870, Dec. 21, 1970, abandoned.

[52] U.S. Cl.................... 75/208 R, 75/200, 29/182, 219/145
[51] Int. Cl............................................. B22f 3/10
[58] Field of Search............. 75/200, 208 R; 29/182; 219/145

[56] References Cited
UNITED STATES PATENTS

| | | | |
|---|---|---|---|
| 2,155,651 | 4/1939 | Goetzel | 75/200 |
| 2,213,523 | 9/1940 | Jones et al. | 29/182 |
| 2,287,251 | 6/1942 | Jones | 75/200 |
| 3,183,086 | 5/1965 | Kurtz et al. | 75/221 |
| 3,301,671 | 1/1967 | Storchheim | 75/200 |

Primary Examiner—Benjamin R. Padgett
Assistant Examiner—B. Hunt
Attorney, Agent, or Firm—Larry R. Cassett; Edmund W. Bopp; H. H. Mathews

[57] ABSTRACT

A method of producing a welding rod using power metallurgy wherein cast iron particles are formed into a suitable shape within a mold cavity, without compaction, and heated in a protective atmosphere at a predetermined temperature for a predetermined time such that a controlled shrinkage occurs to the particle mass and the formed welding rod has a maximum width slightly less than the interior width dimension of the mold, and achieves a density within a predetermined density range.

In an alternate embodiment, a preliminary heating step is utilized to cause homogeneity to occur in a blend of particles.

13 Claims, 5 Drawing Figures

INVENTOR.
HARBHAJAN S. NAYAR
BY
ATTORNEY

INVENTOR.
HARBHAJAN S. NAYAR
BY
ATTORNEY

METHOD OF MAKING WELDING RODS BY SINTERING IN THE PRESENCE OF A LIQUID PHASE

This application is a continuation of Ser. No. 99,870, filed Dec. 21, 1970, now abandoned.

BACKGROUND OF THE INVENTION

This invention relates to the manufacture of welding rods and, more particularly, to an improved welding rod and method of making the same through the use of powder metallurgy.

Welding rods have, in the past, been manufactured through the use of powder metallurgy; however, none of the prior methods has produced a cast iron welding rod similar to that of the present invention where an outer skin is formed which is impervious to liquids and therefore protects the welding rod from moisture entering the rod interior.

Prior art cast iron welding rods are produced by pouring the molten cast iron into suitable mold cavities, cooling the cast iron within the mold cavities, and thereafter removing the rods from the molds. The removal step normally necessitates destruction of the welding rod mold. The process is relatively expensive and the control of the final composition is subject to some limitations. In particular, phosphorus is normally added to increase fluidity of the melt; however, even with such increased fluidity, the casting process is limited in its ability to produce welding rods having small cross-sectional dimensions of significant lengths. In addition, in applications where welding rods are desired with high mechanical properties, the addition of phosphorus must be extremely low, i.e. less than 0.1%, in order to prevent the finished weld from becoming brittle.

SUMMARY OF THE INVENTION

A welding rod produced according to the present method is characterized by an impervious outer skin which provides protection to the porous interior of the rod from the absorption of moisture.

In one embodiment of the invention, a method is employed where cast iron particles of a desired composition (pre-alloyed) having a characteristic eutectic temperature at which the material will eventually form a liquid-solid mixture or phase and below which the material will remain solid are poured into a mold cavity of suitable shape for a welding rod.

Initially cold, the pre-alloyed particles are heated to a temperature at or above the eutectic temperature for a predetermined period of time such that a controlled amount of shrinkage occurs and there is formed a welding rod having a maximum width of slightly less than the internal width of the mold cavity. In addition, the density of the finished rod is within a predetermined density range.

In a second embodiment of the invention, a method is employed wherein a blended mixture of elemental and/or alloyed particles is poured into a mold cavity of a welding rod. The relative amount of particles in the blended mixture is such as to give a desired final composition. A two-step heating cycle is utilized to give the desired welding rod a relatively homogeneous composition and impervious outer skin. The first step comprises heating the particles to a temperature at or above the lowest eutectic temperature of any combination of the particles within the mold cavity, yet below the overall eutectic temperature of the entire system. After sufficient time, alloying and increased homogeneity occur throughout the particle mass. In the second step the temperature is thereafter raised to or slightly above the entire system's eutectic temperature for a predetermined period of time such that the predetermined controlled shrinkage occurs during formation of the welding rod and the finished product has a maximum width slightly less than the internal width of the mold cavity, and has an impervious skin.

There is thus provided a relatively simple process which is more economical for the production of welding rods having a cast iron composition due to the relatively few processing steps and also to the reusability of the molds. In addition, the composition of the final welding rod is easily varied by either varying the composition of the pre-alloyed particles or by blending particles of different composition prior to sintering and, therefore, accurate compositions of a wide variety of welding rods may be readily achieved, including low phosphorus content rods. Further, welding rods having extremely small cross-sectional dimensions are readily obtainable, since fluidity is not a problem as in the prior art casting process for producing cast iron welding rods.

It is understood that the work "particles" used herein includes particles in grit or powder form.

In accordance with the present invention, there is provided a method of producing a welding rod 10 by use of powder metallurgy.

"Pre-alloy Method"

In the pre-alloy method, metal particles are utilized having a size range of 50 to 5000 microns. The particles are of cast iron composition containing carbon, silicon, manganese, and phosphorus as well as other impurities such as sulphur, molybdenum and chromium. Typical composition ranges of such cast irons are as follows by weight percent:

```
C       2.0 - 3.7
Si      1.0 - 3.5
Mn      0.4 - 1.5
P       0   - 0.8
S, Mo, Cr up to 0.2
```

The remaining constituent is iron.

The particles are poured into a mold or cavity of suitable dimensions for a welding rod which may typically range from cross-sectional dimensions of 1/16 to 1 inch and having a length up to 4 feet.

No compaction of the particles is necessary; however, some vibration means may optionally be employed in order to increase the packing density of the particles within the mold. The mold itself is of an inert material to prevent chemical reaction with the particles during the process.

After filling the mold, the particles are heated within the mold cavity in a suitable furnace; the exact temperature of the furnace depending upon (1) the eutectic temperature of the pre-alloyed composition, (2) the mass of the particles within the cavity and (3) the sintering time desired.

Figure 1:
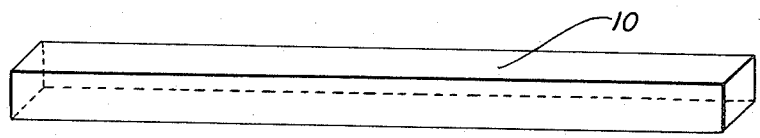
FIG. 1 is a perspective view of an electrode made in accordance with the present invention.
Figure 2:
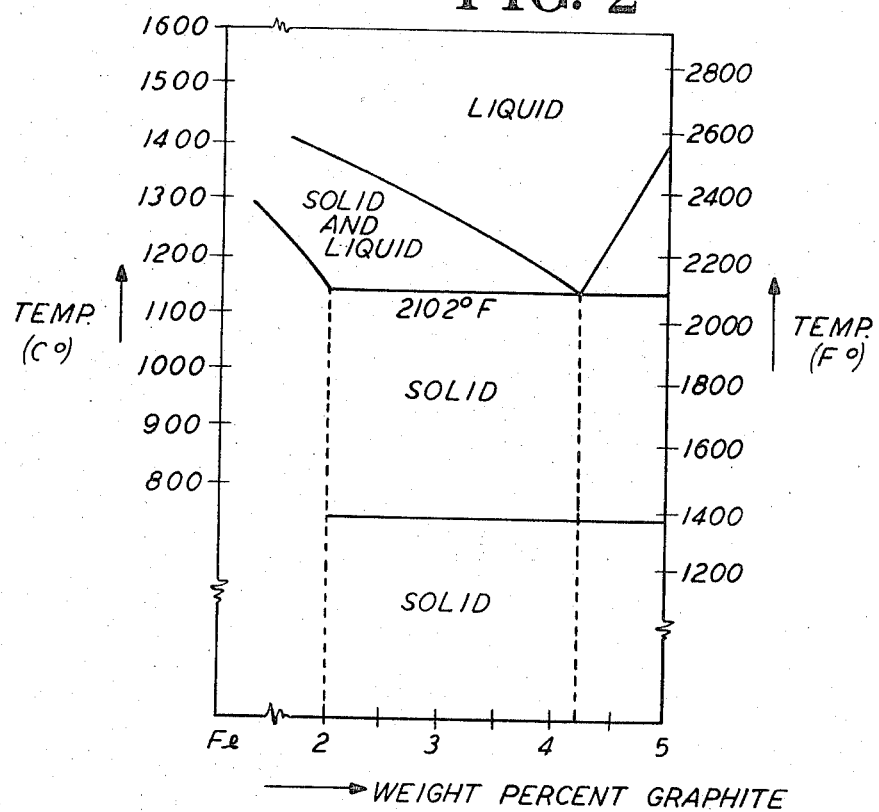
FIG. 2 is a typical phase diagram of an Fe:graphite binary system containing from 2-5 percent graphite showing a characteristic eutectic temperature formation.

As shown in FIG. 2, the characteristic eutectic temperature of the Fe:C binary system is about 2,102°F. The carbon content corresponding to the eutectic temperature is between 2-5 percent by weight. Other elements, such as sulphur, manganese, phosphorus and silicon affect the eutectic temperature and eutectic point to some degree. For example, increasing amounts of phosphorus, manganese and sulphur lower the eutectic temperature slightly, whereas an additional amount of silicon raises the eutectic temperature slightly and changes the eutectic point to a lower carbon content composition.

Typical compositions include iron and the following:

Composition I
    C = 3.0%
    Si = 3.0%
    Mn = 1.2%
    P = 0.5%
    S, Mo, Cr all up to 0.1%
    Approximate eutectic temperature
    = 2085°F Composition II
    C = 3.0%
    Si = 1.15%
    Mn = 0.6%
    P = 0.05%
    S, Mo, Cr all up to 0.1%
    Approximate eutectic temperature =
    2100°F In carrying out the process of this invention, the particles are heated in a furnace having a protective or reducing atmosphere to a temperature at or above the eutectic temperature and held at this temperature for a predetermined period of time, the purpose of which will be hereafter described. In the preferred method, the furnace temperature is up to about 25°F above the eutectic temperature of the particle mass; however, temperatures of up to 50°F above the eutectic temperature of the particle mass are feasible.

The controlled inter-relationship of temperature versus time of the furnace heating is to insure that a predictable controlled shrinkage occurs to the particle mass during the formation of the finished welding rod.

This controlled shrinkage can best be explained with reference to the internal dimensions of a mold cavity. In the following explanation, the width dimension of the particle mass or rod is measured at the bottom of the mass or rod lying within the mold cavity.

The particles, as originally poured into the mold cavity assume the same dimensions as the interior mold cavity. As the particle mass is heated within the furnace, the exterior surface of the particles initially reaches a temperature at or above the eutectic temperature of the particle mass and some melting begins to take place, forming a liquid/solid phase. Shrinking therefore occurs due to the liquid formation and the particle mass draws away from the internal surfaces of the mold cavity. In addition to a decrease in width, the particle mass undergoes a decrease in length and height. As the heating continues, the particle mass continues to form the liquid/solid phase progressively toward the center of the mass. The dimensional shrinkage continues even until the liquid/solid phase reaches almost to the center of the particle mass. Approximately at that point, the length and width of the rod reach a minimum. Further heating causes additional melting of the particle mass and the liquid/solid mass begins to spread into the mold cavity thereby increasing the particle mass width and length at its bottom. Eventually the liquid/solid mass would become dimensionally the same as the internal width and length of the mold cavity and the finished welding rod would not be unlike a normal cast rod wherein the mold must be destroyed or severely damaged in order to remove the finished rod.

In the present invention, therefore, the heat-time relationship is predetermined in accordance with the rod mass, such that the particle mass is limited to a predetermined controlled shrinkage. That is, some melting must occur at the exterior surface of the particle mass in order to cause a certain amount of shrinkage of the mass. This minimum amount of shrinkage seems not only to make the finished product easily removable from the mold, but also aids in forming an impervious outer skin when the finished product is cooled, thereby rendering the final rod resistant to water which cannot enter the rod interior through the impervious exterior. The maximum amount of width shrinkage is self-limiting, in that the liquid-solid mass will reach a minimum width before spreading is experienced and the width again increases as the liquid settles. A certain amount of settling can be tolerated, however, the settling should not advance to the point where the mass width again reaches the mold cavity width dimension.

Figure 3:
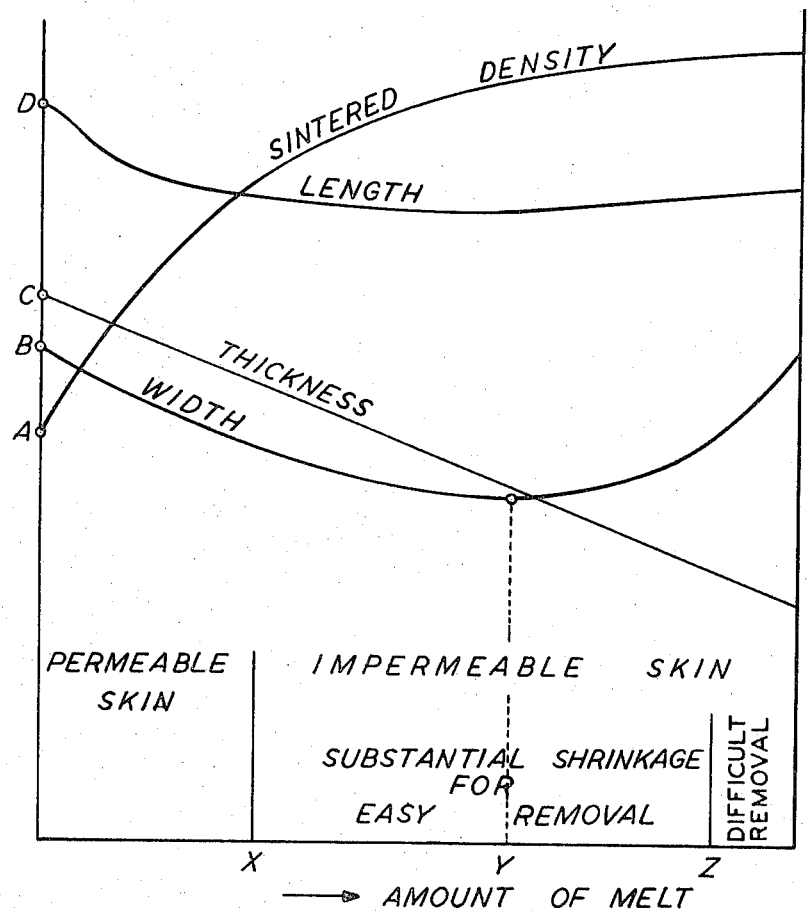
FIG. 3 is a plot of various curves exhibiting typical changes in the characteristics of the particle mass as melting progressively occurs.

In FIG. 3 there is shown graphically a series of curves which indicate typical changes in certain physical characteristics of the particle mass as the melting progresses.

Along the abscissas there is plotted a measurement of amount of melt, i.e., the amount of melting or formation of liquid/phase in the rod. The plot therefore depicts the liquid formation which is basically a function of time, temperature and total particle mass. The ordinate is not plotted in any specific units but may be any arbitrary values. The Figure is useful to show the shapes of the individual curves, as identified, and is not intended to convey specific values of width, thickness, length, or sintered density.

Before any melting occurs, the density, width, thickness and length of the particle mass are shown as arbitrary values of A, B, C and D respectively. As the particle mass absorbs heat and begins to melt, the particle mass begins to shrink, i.e. the width, thickness and length begin to decrease and therefore the sintered density begins to increase rapidly. As explained, the actual rate of heat absorption and therefore the amount of liquid formed during any particular period is dependent upon the time-temperature relationship and the particle mass.

As the amount of melt formed passes the point X on FIG. 3, the sintered rod develops an impermeable skin, i.e. sufficient liquid has formed around the exterior of the particle mass such that after cooling an impermeable skin will be observed. A further increase in the amount of liquid formed causes the particle mass to further decrease in width, thickness and length until the point Y is reached. At Y, the maximum shrinkage of the width and length dimension has been reached. Further increase in the amount of liquid formed causes the liquid/solid mixture to start spreading within the mold cavity, thus the rod mass width and length begins to increase, however, the thickness continues to decrease as the mass settles. The sintered density continues to increase, but at a lower rate.

As the amount of liquid formed progresses beyond point Z on the FIG. 3, the increasing width of the sintered rod approaches the initial width of the particle mass, i.e. the width of the mold cavity, and removing of the finished rod from the mold cavity becomes difficult and uneconomical, not unlike the usual problems experienced in removing a prior art cast rod from a mold cavity.

Therefore, in carrying out the process of the present invention, the amount of liquid formation during sintering lies between the points X and Z in the graph, or resulting in a predetermined range of shrinkage and sintered density. The desired product thereby formed, has a characteristically impermeable outer skin and is easily removable from the mold cavity by simply inverting the mold.

Figure 4:
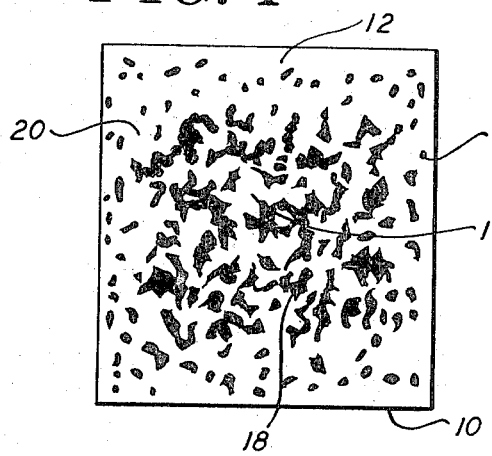
FIG. 4 is a representation of a cross-sectional view showing the overall macro-structure of a welding rod produced in accordance with the present invention where the exterior of the rod has reached at least the eutectic temperature, yet the interior has not reached the eutectic temperature of the particle mass.
Figure 5:
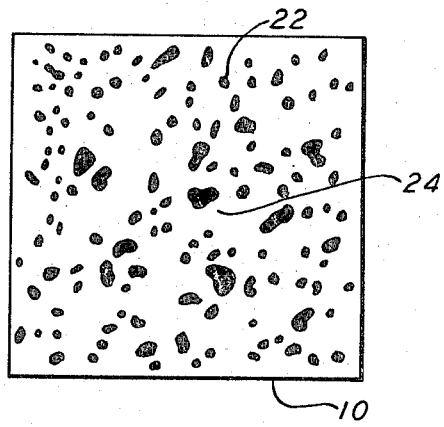
FIG. 5 is a representation of a cross-sectional view similar to FIG. 4 wherein both the exterior and the interior of the rod have reached the eutectic temperature of the particle mass.

The macro structure of the cross-section of finished rods 10 is illustrated in FIGS. 4 and 5. In FIG. 4 the exterior of the finished rod has reached at least the eutectic temperature while the interior has not been subjected to a temperature in excess of its eutectic temperature, therefore, the interior has interconnected porosity while the exterior portion 12 of the rod is impervious and contains isolated relatively round pores 14 (dark areas) whereas the interior portion 16 is highly porous and contains interconnected relatively angular pores 18 (dark areas). The metallic portion 20 of the rod is shown as light areas in FIG. 4.

In FIG. 5, the macro-structure shown is characteristic of a finished welding rod where both the exterior and the interior have experienced a temperature in excess of the eutectic temperature and therefore liquid phase has been formed within the interior. The macro-structure is predominantly of isolated, relatively round pores 22 even within the rod interior 24.

The impervious skin of rod 10 is such that a drop of water placed upon the surface of a welding rod, made in accordance with this invention, will not be drawn by capillary action into the interior of the welding rod.

The following examples demonstrate the use of the process of this invention:

EXAMPLE I

Cast iron particles, in the form of grit, having a pre-alloyed composition of Composition I and a grit size of 14 mesh and finer, are poured into a graphite mold cavity having internal dimensions of 0.468 inch wide × 0.493 inch deep × 25 inches long. The mold is tapped to increase the particle density to about 55.6 percent of the theoretical density of cast iron of Composition I.

The mold is placed on a moving conveyor belt to be transported through a furnace having a dissociated ammonia atmosphere (75% $H_2$ + 25% $N_2$) and the furnace temperature in its flat, hot zone is approximately 2115°F. The furnace hot zone is about 10 feet long and the flat hot zone is about 4 feet long. The belt speed is approximately 5 – 6 inches per minute. The mold is allowed to cool within the protective atmosphere in the cool zone of the furnace, then removed from the furnace.

The rods are measured and found to be within the following ranges:
Sintered density 5.3–6.3 gm/cc (73–89 percent theoretical density)
Width — 0.39 – 0.44 inch
Length — 24.0 – 24.5 inch Each of the above example rods falls freely from the mold when inverted and it is found that each has an impervious skin.

EXAMPLE II

The same method is employed as in Example I except the grit is poured into a graphite mold having internal dimensions of 0.312 inch wide × 0.330 inch deep and 25 inches long. The same furnace is utilized as in Example I except the temperature in the flat, hot zone is approximately 2,110°F.

Again, the rods are measured and found to be within the following ranges:
Sintered density 4.9 – 6.3 gm/cc (67–89 percent theoretical density)
Width 0.25 – 0.30 inch
Length 23¾ – 24½ inches.

"Alloying Method"

In the alloying method of producing welding rods, particles of two or more compositions are blended to form a relatively homogeneously mixed blend prior to pouring into the mold cavity. In this manner, particles of different compositions may be added in varying amounts in order to easily and accurately control the final composition of the welding rod.

As an example, the cast iron grit of Composition II is easily and economically available as a standard grit. To the particles of this composition, additional particles of different compositions, such as A and B, may be added to affect the final composition and hence the welding properties of the finished welding rod.

Blending mixture of particles of composition II, A and B when poured into a mold cavity form various types of interfaces; for instance II–A, A–B, II–B, II–II, A–A, B–B.

Each type of interface can be represented by a characteristic phase diagram showing the eutectic or solidus temperature at which the melting may begin at that interface. These separate phase diagrams may be identified as II–A, A–B, II–B, II, A, B; while the over-all system phase diagram is identified as II–A–B.

After placing the blended particles into a mold cavity as described in the "pre-alloy method," the mold is placed in a furnace and heated initially to a temperature at or above the lowest of at least one of the eutectic or solidus temperatures of the phase diagrams II–A, II–B, A–B, II, A, or B, which is below the eutectic temperature of the overall II–A–B system composition.

In this manner, melting occurs at one or more of the II–A, II–B, A–B, II, A, or B interfaces such that homogenization process is accelerated. This temperature is maintained until sufficient homogeneity is reached throughout the particle mass. As a second step, the furnace temperature is thereafter raised to at or above the eutectic temperature of the overall composition II--A-B. Again as in the "pre-alloy method" the final furnace temperature and heating time are controlled such that a controlled shrinkage occurs in the particle mass and the density of the finished rod is within a predetermined density range and the outer skin is impermeable.

EXAMPLE III

A standard grit of Composition II, having an overall grit size of 50/120 mesh is blended with the following alloying particles, in the proportions shown:

| Content (%) | Particles | Mesh |
|---|---|---|
| 92.75 | Standard grit | 50/120 |
| 5 | 50/50% Fe-Si | 80/100 |
| 2 | 28% Fe-P | 70/100 |
| 0.25 | Graphite | 100/200 |

The mixture is blended for about ½ hour in a V-blender to provide a homogenous mixture. The mixture is poured into a graphite mold cavity having internal dimensions of ⅜ × ⅜ inch and a length of 18 inches. The mold is placed on a moving conveyor belt of the same furnace as utilized in Examples I and II having a belt speed of approximately 6 inches per minute. The temperature profile in the furnace is adjusted such that the protective furnace atmosphere gradually reaches a maximum furnace temperature of about 2,095°F and is thereafter constant for a distance of about 1 foot before the cool zone begins. The mold, therefore, travels through the constant temperature zone in about 2 minutes. During the travel, the particles reach a temperature of about 1,800°F where some melting first occurs at the Fe:P:C interfaces and homogeneity is enhanced. Further homogeneity occurs as the temperature of the particles reaches about 1,850°F where melting occurs at the Fe:P:C:Si interfaces. The particles thereafter reach temperature of about 2,095°F, and then cool within the protection atmosphere of the furnace cool zone. The mold is removed from the furnace and inverted. The formed rod again drops freely from the mold. The rod is analyzed and found to have a relatively homogeneous composition with a phosphorus content of about 0.47 percent by weight and a silicon content of about 2.6 percent by weight of the total composition. The sintered density is about 5.97 gm/cc (83 percent of theoretical density) and the width and length are 0.35 inch and 17½ inches respectively. Thus it is found that the final composition can easily be affected by the addition of alloying materials in particle form and the process produces a welding rod having a relatively homogeneous composition, as well as the characteristic impervious skin.

What is claimed is:

1. In the method of forming a metal article having an impermeable skin wherein metal particles of a known composition are placed in a mold cavity and heated in a protective atmosphere to a predetermined temperature sufficiently high to form some liquid metal, the improvement comprising heating the particle mass until sufficient liquid has formed on the surface thereof to form an impermeable skin upon cooling and ceasing the heating at a point when the particle mass has shrunk away from contact with the sides of the mold cavity and thereafter removing heat from the particle mass to cause it to solidify while a predetermined clearance exists between the particle mass and the mold cavity sides.

2. A method of forming a metal article as defined in claim 1 wherein said metal particles are of cast iron composition.

3. A method of forming a metal article as defined in claim 2 wherein said predetermined temperature is within the range of from about the particle mass eutectic temperature to less than 50°F above the eutectic temperature.

4. A method of forming a metal article as defined in claim 2 wherein said predetermined temperature is about 25°F above the particle mass eutectic temperature.

5. A method of forming a metal article as defined in claim 2 wherein said particles of cast iron composition are Fe and the following by weight percent:

| | | |
|---|---|---|
| C | — | 2.0 to 3.7 |
| Si | — | 1.0 to 3.5 |
| Mn | — | 0.4 to 1.5 |
| P | — | 0 to 0.8 |
| S, Mo, Cr up to 0.2 | | |

6. In the method of forming a welding rod of a cast iron composition having an impermeable skin wherein particles having a cast iron composition are placed in an elongated mold cavity and heated in a protective atmosphere to a predetermined temperature to cause the formation of liquid/solid phase within the particle mass, the improvement comprising heating the particle mass at a temperature at least as high as the eutectic temperature of the particle mass to form sufficient liquid on the surface thereof to form an impermeable skin upon cooling, ceasing the heating at a point when the particle mass has shrunk away from contact with the sides of the mold cavity, and thereafter cooling the particle mass to cause it to solidify while a predetermined clearance exists between the particle mass and the mold cavity sides.

7. A method of forming a welding rod as defined in claim 6 wherein said predetermined total clearance is at least 0.012 inch from the sides of the mold cavity.

8. A method of forming a metal article having an impermeable skin comprising the steps of:

a. blending metal particles of predetermined composition with particles of at least one alloying material;

b. introducing the blended mixture of metal particles and alloying particles into a mold cavity;

c. heating the blended mixture in a protective atmosphere to a temperature at least as high as the eutectic temperature of the metal particles and said at least one alloying material;

d. raising the heating temperature to a predetermined temperature at least as high as the eutectic temperature of the overall system of metal particles and alloying material to form a liquid phase within the blended mixture of particles;

e. ceasing the heating of the particle mass when it has shrunk away from contact with the mold cavity sides and sufficient melting of the metal has occurred on the surface thereof to form an impermeable skin upon solidifying;

f. solidifying said shrunken particle mass while at least a predetermined clearance exists between said particle mass and said mold cavity sides.

9. A process as described in claim 8 wherein said blended mixture has an overall cast iron composition.

10. A process as described in claim 9 wherein said at least one alloying material includes particles having silicon content.

11. A process as described in claim 10 wherein said at least one alloying material includes particles having a phosphorus content.

12. In the method of forming a metal article having an impermeable skin wherein metal particles of a known composition and free of binders are placed without compaction in a mold cavity and heated in a protective atmosphere to a predetermined temperature sufficiently high to form some liquid metal at the particle interfaces, the improvement comprising heating the particle mass until sufficient liquid has formed on the surface thereof to form an impermeable skin upon cooling and ceasing the heating at a point when the particle mass remains free of a mechanical or chemical bond with the sides of the mold cavity, removing heat from the particle mass to cause it to solidify, and removing said solidified particle mass from the mold.

13. In the method of forming a welding rod of a cast iron composition having an impermeable skin wherein particles having a cast iron composition and free of binders are placed without compaction in an elongated mold cavity and heated in a protective atmosphere to a predetermined temperature to cause the formation of liquid/solid phase within the particle mass, the improvement comprising heating the particle mass at a temperature at least as high as the eutectic temperature of the particle mass to form sufficient liquid on the surface thereof to form an impermeable skin upon cooling, ceasing the heating at a point when the particle mass remains free of a mechanical or chemical bond with the sides of the mold cavity, cooling the particle mass to cause it to solidify, and removing said solidified particle mass from the mold.

* * * * *